John W. Ferry
INVENTOR.

April 1, 1969    J. W. FERRY    3,435,630
LIQUID IMMERSION TYPE FREEZER
Filed July 24, 1967    Sheet 2 of 4

John W. Ferry
INVENTOR.

BY Dominik, Stein + Knechtel
ATTORNEYS

April 1, 1969

J. W. FERRY 3,435,630

LIQUID IMMERSION TYPE FREEZER

Filed July 24, 1967

John W. Ferry
INVENTOR.

BY Dominik, Stein + Knechtel
ATTORNEYS

United States Patent Office 3,435,630
Patented Apr. 1, 1969

3,435,630
LIQUID IMMERSION TYPE FREEZER
John W. Ferry, Tampa, Fla., assignor to International Refrigeration Company, Inc., a corporation of Florida
Filed July 24, 1967, Ser. No. 655,419
Int. Cl. F25b *3/00;* B63j *2/12;* F25d *25/04*
U.S. Cl. 62—282                    10 Claims

ABSTRACT OF THE DISCLOSURE

A quick freeze refrigeration apparatus which is of an integral construction that is adapted to fit atop or over the hold hatch of a fishing boat. The apparatus is of a generally tubular construction and a has a number of compartments therein through which a freeze solution is caused to circulate. Still other compartments contain the refrigeration units, cooling coils and the like for quick freezing shrimp, fish and the like. The latter are dumped into the apparatus, frozen and thereafter automatically conveyed and dumped into the hold of the fishing boat for storage. The apparatus further is adapted to refrigerate the storage hold.

---

This invention relates, in general, to quick freeze refrigeration apparatus and, in particular, to quick freezing refrigeration apparatus which is adapted for use aboard ships for freezing shrimp, fish and the like.

Presently, there are numerous different types of quick freeze refrigeration apparatus available, however, all are generally unsatisfactory for use aboard fishing boats, for one reason or another. For example, see U.S. Patent 1,912,896 to Hiller. The apparatus of this patent emfreezing sea water and a plurality of brine tanks so arranged that the freezing brine of any one tank after its use has been discontinued may be utilized to partially cool the brine being introduced in any other tank. It is readily apparent that this apparatus is generally inefficient and, furthermore requires a complex, bulky, substantially permanent installation. Accordingly, it is objectionable for a number of different reasons.

In U.S. Patent 2,059,970 to Robillard, quick freeze refrigeration apparatus is disclosed wherein the shrimp or fish are rapidly cooled and frozen by contacting them directly with a volatile liquid refrigerant which is vaporized, recondensed, recovered and used over again. A continuous belt conveyor is used to transport the shrimp and fish through the volatile liquid. In viewing the drawings of the subject apparatus, it is apparent that it is far more complex, bulkier and more difficult to install than the above-described Hiller apparatus.

Still additional quick freeze apparatus is disclosed in U.S. Patent 2,077,608 to Wood. With this apparatus, the articles are frozen by a flow, blast or accelerated current of air or other aeriform fluid reduced to a temperature not higher than zero Fahrenheit. The apparatus generally is not adapted for shipboard use.

U.S. Patent 2,513,004 discloses a ship's hull construction having a large number of compartments or containers in which shrimp or fish are retained. A refrigerant is circulated around the compartments or containers in conductive contact with the shrimp or fish. Similar large, complex installations in ships are disclosed in U.S. Patents 2,746,272, 2,909,040, 3,049,890, and 3,261,176.

Still other types of quick freeze refrigeration are available which use a solution of salt and syrup to quick freeze the shrimp or fish. In most cases, the apparatus has a construction such that the solution can spill out of it, generally on the crew or deck. This not only is messy and presents a safety hazard, it also is a waste of the solution. Others use baskets which must be lifted in and out of the tank in which the solution is retained and/or have heavy lids to open and close. This type of apparatus is very inconvenient and its operation is time consuming. In addition, they are very dangerous since it is extremely difficult to handle the baskets and the heavy lids in a rolling sea. Such arrangements have cost more than one man his fingers or hands. Still other apparatus is complex in operation and/or requires considerable deck space for its installation which, in many cases, is further objectionable because it is a permanent or semi-permanent installation.

An object of the present invention is to provide improved quick freeze refrigeration apparatus.

Another object is to provide improved quick freeze refrigeration apparatus which is particularly adapted for use aboard fishing boats.

Another object is to provide improved apparatus of the described type which can be easily removably affixed over the hold hatch of a fishing boat.

Still another object is to provide improved apparatus of the described type which has a construction such that the solution therein prevented from slopping out of it.

A still further object is to provide apparatus of the described type which does not require the handling of baskets in and out of a tank.

Still another object is to provide apparatus of the described type which is of a construction so as to save deck space.

A still further object is to provide apparatus of the described type which is further adapted to refrigerate the hold of a fishing boat.

Another object is to provide apparatus of the described type which is relatively simple in construction and requires little maintenance.

Other objects of the invention will in part be obvious and will in part appear hereinafter.

The above objectives are accomplished with quick freeze refrigeration apparatus which is of an integral construction that is adapted to fit atop or over the hold latch of a fishing boat. The apparatus is of a generally tubular construction and has a number of compartments therein through which a freeze solution is caused to circulate. Still other compartments contain the refrigeration units, cooling coils and the like for quick freezing shrimp, fish and the like. The latter are dumped into the apparatus, frozen and thereafter automatically conveyed and dumped into the hold of the fishing boat for storage. The apparatus further is adapted to refrigerate the storage hold.

The invention accordingly comprises the features of construction, combination of elements, and arrangement of parts which will be exemplified in the construction hereinafter set forth, and the scope of the invention will be indicated in the claims.

For a fuller understanding of the nature and objects of the invention, reference should be had to the following detailed description taken in connection with the accompanying drawings in which.

Similar reference characters refer to similar parts throughout the several views of the drawings.

Figure 1:
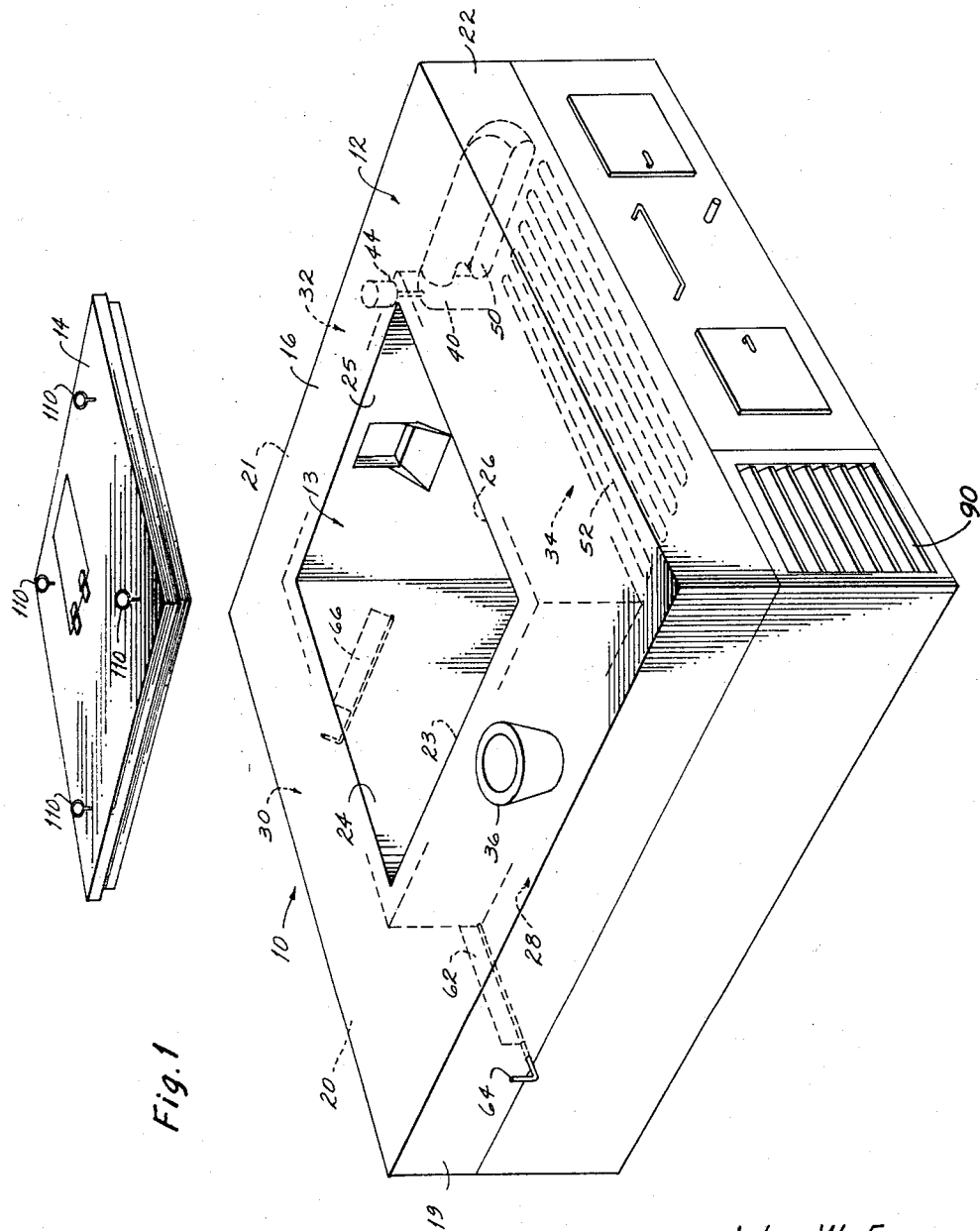
FIG. 1 is a perspective view of the quick freeze refrigeration apparatus.
Figure 2:
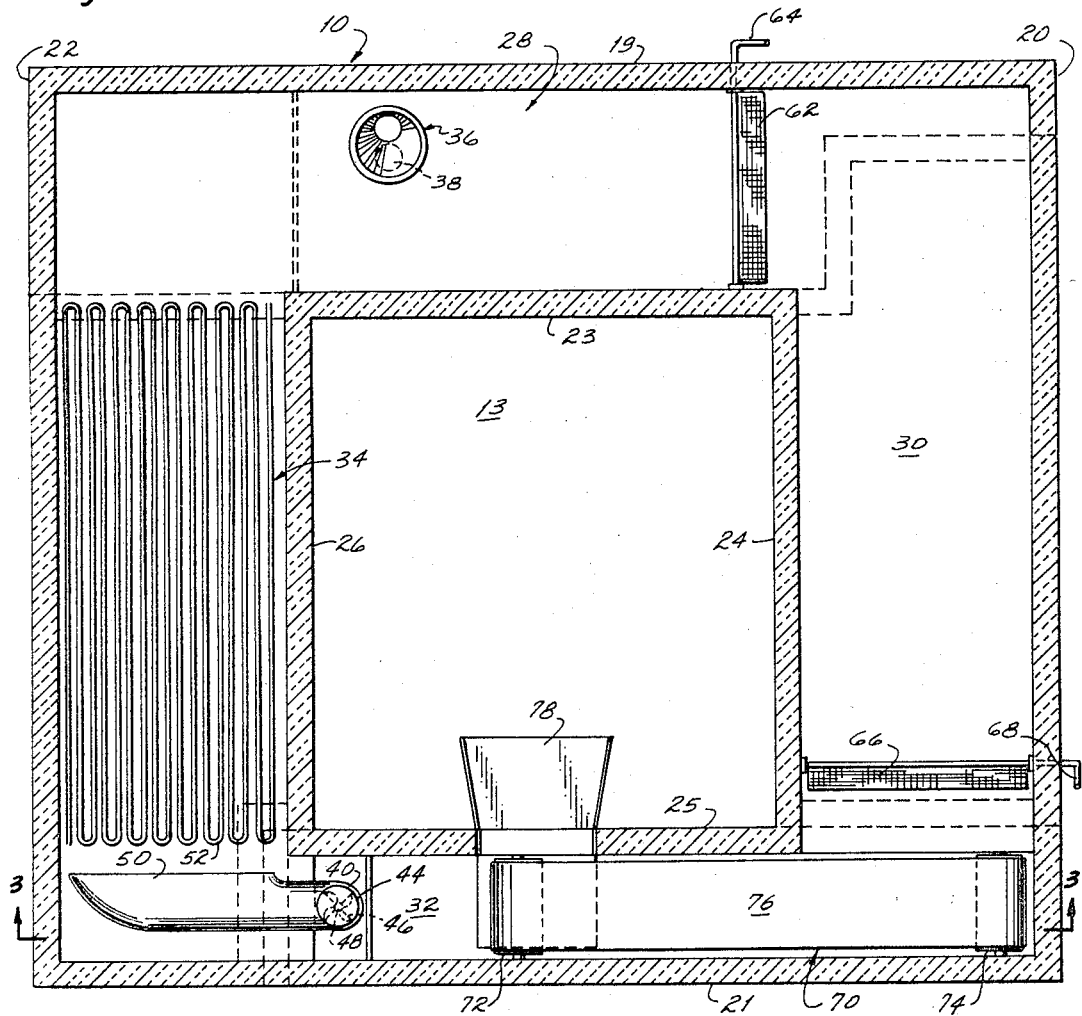
FIG. 2 is a sectional view, taken along lines 2—2 of FIG. 3.
Figure 3:
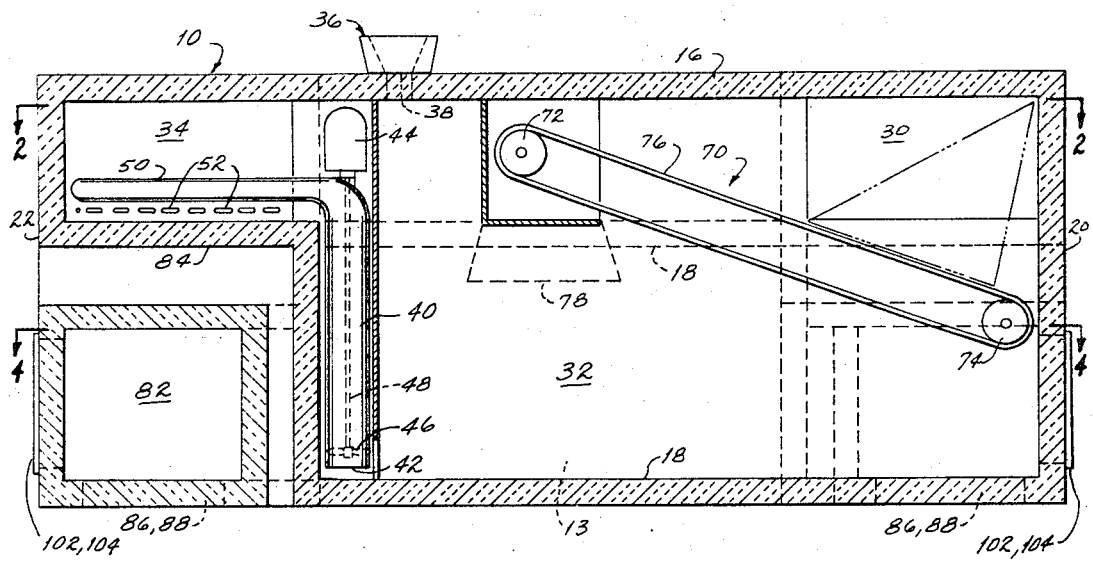
FIG. 3 is a sectional view, taken along lines 3—3 of FIG. 2.
Figure 4:
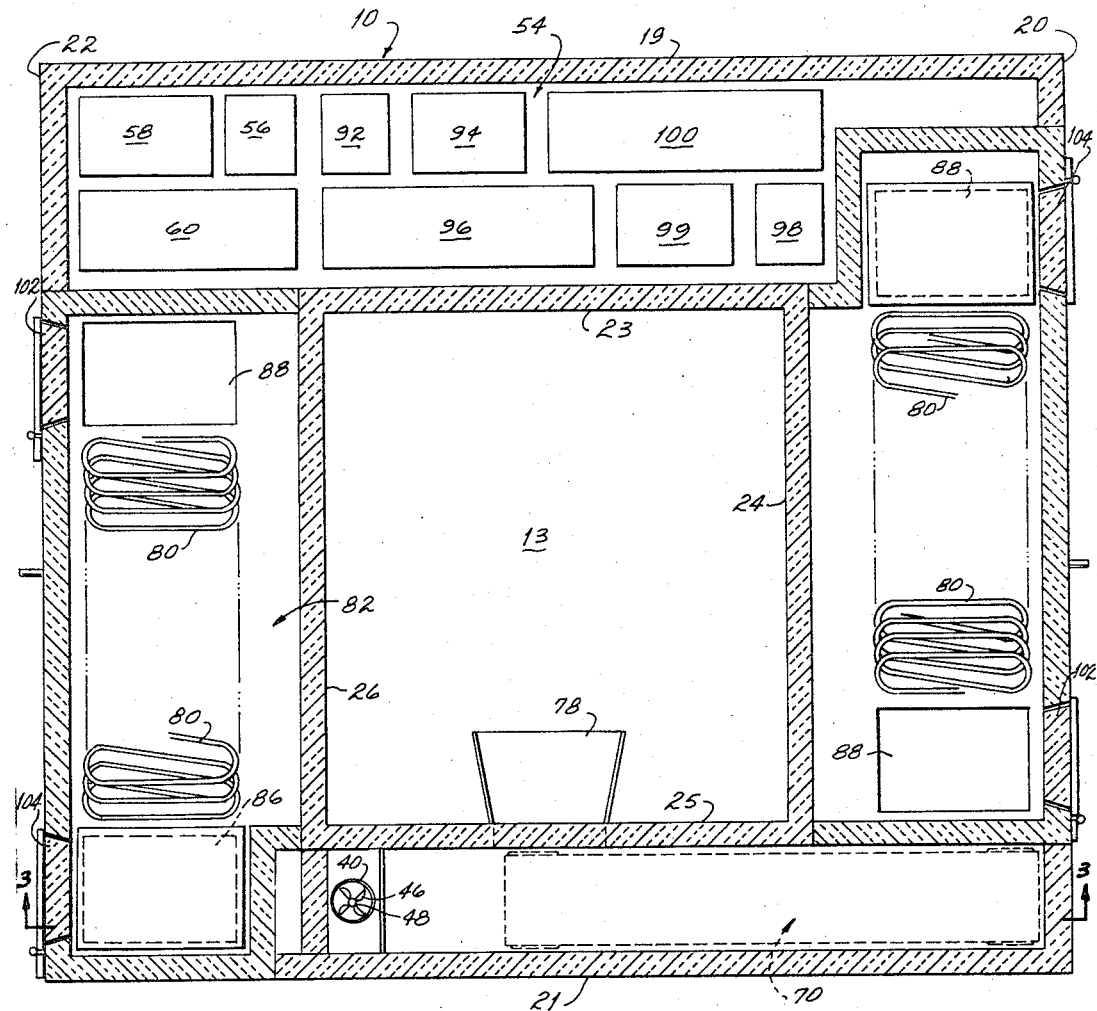
FIG. 4 is a sectional view, taken along lines 4—4 of FIG. 3.

Referring now to the drawings, in FIG. 1 there is shown a quick freeze apparatus 10 which is of an integral construction and which is adapted to be easily and quickly installed over, for example, the hatch of a fishing boat. The apparatus 10 includes a generally square-shaped, tubular tank 12, having an open centrally positioned hatch 13 which is closable with a removable hatch cover 14. A solution of corn syrup, salt and water is circulated through the tank 12, in a manner described below, and functions to quick freeze the articles, in the described case shrimp, placed therein.

More specifically, the tank 12 is substantially square-shaped and has a top wall 16, a bottom wall 18, outer side walls 19–22 and inner side walls 23–26 so as to provide an enclosure through which the solution can flow. The inner side walls 23–26 form the hatch 13, centrally of the tank 12. Within the tank 12 are a number of compartments, namely, a flash-freeze compartment 28, a holding compartment 30, a solution compartment 32 and a brine coil compartment 34. The tank 12 also has interior compartment walls, for dividing its interior into a number of other individual compartments, as described more fully below.

A generally cylindrical-shaped hopper 36 is formed in its top wall 16, along one of its sides, extending into its interior. The hopper 36 can be open at its top but preferably has a shutter 38 at its lower end which can be manually opened and closed. Normally, the shrimp is loaded into the hopper 36 until it is full. The shutter 38 is then operated to allow the shrimp to spill into the flash-freeze compartment 28. When the hopper 36 is empty, the shutter 38 is closed again to prevent the solution in the tank 12 from splashing out of it.

The solution in the tank 12 is circulated in a clockwise fashion (as illustrated) through the flash-freeze compartment 28, the holding compartment 30, the solution compartment 32 and the brine coil compartment 34. The solution compartment 32 is positioned in the tank 12, opposite the flash-freeze compartment 28, and is substantially deeper than the other compartments. The solution compartment 32 functions as a storage tank for the solution flowing through the tank 12. At its one end is positioned a lift pump 40 including a lift tube 42 open at its lower end and a motor 44. The motor 44 drives a propeller or blade 46 at the open end of the lift tube and affixed to the end of a motor shaft 48. A spill tray 50 is affixed to the upper end of the lift tube 42 and is adapted to convey and to spill the solution substantially over the entire width of the brine coil compartment 34.

The holding compartment 30 and the coil compartment 34 each has convoluted brine coils 52 in it, preferably affixed in spaced-relation to their bottom walls. The brine coils 52 are coupled to and cooled by a refrigeration unit within the component compartment 54.

The component compartment 54 is formed between a bottom wall (not shown) of the flash-freeze compartment 28 and the bottom wall 18 of the tank 12. This component compartment is sealed so as to prevent any of the solution from entering it. The component compartment 54 has the above-mentioned refrigeration unit in it, which includes a motor 56, a compressor 58 and a condenser 60, each of which can be of standard construction. The refrigeration unit cools the solution in the tank 12 as it circulates through the tank.

Circulation of the solution is established and maintained by the lift pump 40 which lifts the solution from the bottom of the solution compartment 32, through the lift tube 40, and spills it onto the spill tray 50. From the spill tray, it is distributed over the ends of the brine coils 52. As the solution flows through the coil compartment 34, atop and along the length of the brine coils 52, it is cooled to approximately minus 10 or 12 degrees below zero degree Fahrenheit. From the coil compartment 34, the solution flows into and through both the flash-freeze compartment 28 and the holding compartment 30, back into the solution compartment 32. It may be noted that the solution also is cooled as it flows through the holding compartment 28, atop and along the length of the brine coils 52 therein.

The flash-freeze compartment 28 has a gate 62 in it downstream from the hopper 36. The gate 62 can be a screen or other similar construction so as to permit the solution to flow through it and to prevent further travel of the shrimp dumped into the flash-freeze compartment. The gate 62 is pivotally affixed between the inner and outer side walls 19 and 23 of the tank. A handle 64 which can be manually operated is affixed to the gate 62, for tilting it to permit the shrimp to pass by it, to the holding compartment 30.

The holding compartment 30 is simply a further freezing area in which the shrimp can be retained until frozen more solidly, if desired. The hold compartment 30 has a gate 66 which can be like the gate 62 and likewise has a handle 68 for tilting it to permit the shrimp to flow pass the gate.

The solution compartment 32 has a continuous belt conveyor 70 within it which is rotatably supported on a pair of rollers 72 and 74. One of the rollers 72, 74 has motor means (not shown) affixed to it for rotatably driving it and the belt 76 of the conveyor 70. The conveyor 70 is angularly disposed and functions to lift the shrimp from the solution and to deposit the shrimp on a drop chute 78 which is positioned to spill the frozen shrimp into the storage hold of the fishing boat.

As indicated above, the solution in the tank 12 is preferably a special solution of corn syrup, salt and water which has been found to be exceptionally satisfactory to quick freeze the shrimp placed within the tank 12. Other solutions, however, can be used and for the purpose of the invention, it is only necessary that an appropriate solution for freezing the shirmp be contained within the tank 12. The temperature of the solution is thermostatically controlled, to prevent the solution from freezing up and separating. Heat transfer is designed to provide a freeze production rate of 500 lbs./hr. on a continuous basis.

In use, the shrimp is dumped into the hopper 36 until it is full. The hopper's shutter 38 is then opened to spill the shrimp into the solution, within the flash-freeze compartment 28. The circulation of the solution carries the shrimp to the gate 62 therein, and the shrimp is held in the flash-freeze compartment. The gate 62 is then opened, by manually tilting it with the handle 64 affixed to it, to permit the shrimp to flow into the holding compartment 30.

The shrimp is retained, by the gate 66, within the holding compartment 30 until frozen in approximately ten minutes time. By the time the shrimp has passed through the flash-freeze and holding compartments 28 and 30, the shrimp is properly prepared for cold storage in the ship's hold.

Upon passing through the holding compartment, the shrimp are spilled onto the conveyor 70 and lifted out of the solution. At the top end of the conveyor 70, the shrimp can be sacked, boxed, or packed in bulk to be taken to the refrigerated storage hold below deck. Alternatively, the shrimp can merely be spilled off of the conveyor 70 onto the drop chute 78 and deposited in bulk in the hold.

The quick freeze apparatus 10 further is adapted to refrigerate the storage hold of the ship. For this purpose, a convoluted brine or cooling coil 80 is affixed within a hold coil compartment 82 formed below the coil compartment 34, between a bottom wall 84 of the coil compartment 34 and the bottom wall 18 of the tank 12. A pair of louver shutter or other closure arrangement openings 86 and 88 are formed in the bottom wall 18 of the tank 12, at the respective ends of the hold coil compartment 82 and opening into the hold of the ship. A similar opening 90 is formed in the outer side wall 22 of the tank 12, and a fan (not shown) is mounted near it within the hold coil compartment. The fan draws ambient air into the hold coil compartment and blows it across the cooling coil 80. The cooled air passes through the opening 88, into the hold of the ship. Simultaneously, cool air is drawn out of the hold, through the opening 86, and recirculated over the cooling coil 80.

The cooling coil 80 is coupled to and cooled by a second refrigeration unit, including a motor 92, a compresser 94 and a condenser 96, within the component compartment 54. A similar hold cooling coil compartment can be formed beneath the holding compartment 30, and additional refrigeration apparatus including still another motor 98, compresser 99 and condenser 100, included in the component compartment 54 for operating it.

A pair of defrosting doors 102 and 104 are provided in the outer side wall 22 of the tank 12, for defrosting the cooling coil 80. The openings 86 and 88 into the hold are closed, and the defrosting doors 102 and 104 are opened to permit ambient air to be circulated through the hold coil compartment, over the cooling coil 80. Circulation of the ambient air through the hold coil compartment is aided by the fan adjacent the opening 90, and provides more rapid defrosting.

Tank 12 has been constructed of type 316 stainless steel, with double welded seams and joints. The tank is insulated with Dow Chemical Urethane, 3 inches thick on its sides and bottom. The brine coils 52 are stainless steel 0.060 inch tubing which is 1 inch in diameter and which is fusion welded with continuous pipe to each pass paralleled to headers in and out to keep the pressure drop to a minimum and rate of flow to a maximum. All brackets, clamps, or other braces also are type 316 stainless steel and are welded or bolted to the tank 12. Electrolitic action is thereby maintained at nearly a zero reading.

The hatch 13 is completely removable at unloading time, being held in place on the tank 12 by toggle clamps 110. The overall design of the apparatus 10 saves deck space and simplifies operation and work time, so that the crew can concentrate on fishing.

It will thus be seen that the objects set forth above, among those made apparent from the preceding description, are efficiently attained and, since certain changes may be made in the above construction without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention, which, as a matter of language, might be said to fall therebetween.

Now that the invention has been described, what is claimed is:

1. A quick freeze refrigeration apparatus comprising: a tank which is tubular in cross-section and having a plurality of interior walls therein dividing the interior into a plurality of compartments; refrigeration coils included in at least one of said compartments; a freeze solution contained within said tank, circulating means within said tank for circulating said solution through said tank and over said refrigeration coils to cool it; one of said compartments forming a quick freeze compartment and having a gate therein for retaining objects with said quick freeze compartment for quick freezing them, said gate being operable to open the same to permit said objects to pass from said quick freeze compartment; another compartment within said tank forming a solution compartment and having conveyor means therein adapted to lift said frozen objects out of said solution and to transport them to a subsequent station for further handling; another one of said compartments forming a component compartment which is sealed to prevent said solution from entering it having a refrigeration unit therein coupled to said refrigeration coils for cooling them.

2. The quick freeze refrigeration apparatus of claim 1, further including a holding compartment and a coil compartment positioned opposite one another and disposed between said quick freeze compartment and said solution compartment, said solution being circulated from said solution compartment through said coil compartment, said quick freeze compartment and said holding compartment, in that order, back into said solution compartment, said refrigeration coils being disposed within said coil compartment.

3. The quick freeze refrigeration apparatus of claim 2, wherein said tank is substantially square-shaped and has inner side walls forming an open area centrally thereof, said quick freeze compartment, said holding compartment, said solution compartment and said coil compartment forming the respective sides of said tank.

4. The quick freeze refrigeration apparatus of claim 3, wherein said open area centrally positioned in said tank forms a hatch extending through said tank from its top to its bottom; and a hatch cover removably affixed to said tank atop said hatch to close it.

5. The quick freeze refrigeration apparatus of claim 4, further including a hopper extending into said quick freeze compartment upstream from said gate therein, said hopper including shutter means which can be opened and closed to retain said object therein and to dump said objects into said quick freeze compartment, said shutter means further functioning to prevent said solution from spilling out of said tank.

6. The quick freeze refrigeration apparatus of claim 5, further including a gate in said holding compartment which can be opened and closed to retain said objects within said compartment and to pass through it.

7. The quick freeze refrigeration apparatus of claim 6, further including securing means for affixing said apparatus atop a hold hatch of a fishing boat and the like.

8. The quick freeze refrigeration apparatus of claim 7, further including a drop chute in the inner side wall of said tank positioned adjacent the upper end of said conveyor means so as to receive thereon the objects transported by said conveyor means and spilled therefrom, said drop chute spilling said objects into the hatch centrally positioned in said tank, whereby said objects can be deposited in bulk in the hold of a fishing boat.

9. The quick freeze refrigeration apparatus of claim 7, further including a hold cooling coil compartment in said tank having cooling coils therein; a pair of closable openings in the bottom wall of said tank in said hold cooling coil compartment at the opposite ends of said cooling coils, respectively; air circulating means for causing ambient air to flow into said hold cooling coil compartment, over said cooling coils and through one of said closable openings into the hold of said fishing boat to cool said hold, said air circulating means further causing cooled air from said hold to flow from the other one of said closable openings and be re-circulated over said cooling coils and back into said hold.

10. The quick freeze refrigeration apparatus of claim 9, further including a pair of defrosting doors in said tank which can be opened to permit ambient air to flow over said cooling coils to defrost said cooling coils.

References Cited

UNITED STATES PATENTS 2,791,890    5/1957    Hoyer _____ 62—435 X
3,049,890    8/1962    Ruppel _____ 62—435 X ROBERT A. O'LEARY, *Primary Examiner.*

WILLIAM E. WAYNER, *Assistant Examiner.*

U.S. Cl. X.R.

62—448, 435, 374, 240

PO-1050
(5/69)

UNITED STATES PATENT OFFICE
CERTIFICATE OF CORRECTION

Patent No. 3,435,630  Dated April 1, 1969

Inventor(s) John W. Ferry

It is certified that error appears in the above-identified patent and that said Letters Patent are hereby corrected as shown below:

Column 2, line 22, after "therein" insert -- is --

Column 2, line 39, delete "latch" and insert -- hatch --

Column 5, line 30, delete "13" and after "hatch" insert -- cover 14 --.

SIGNED AND
SEALED

SEP 30 1969

(SEAL)
Attest:

Edward M. Fletcher, Jr.
Attesting Officer

WILLIAM E. SCHUYLER, JR.
Commissioner of Patents